(12) United States Patent
Min (10) Patent No.: US 6,480,596 B1
(45) Date of Patent: Nov. 12, 2002

(54) DIRECT INWARD-OUTWARD DIALING TRUNK CIRCUIT

(75) Inventor: Kyung-Hwa Min, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/009,743

(22) Filed: Jan. 20, 1998

Related U.S. Application Data (63) Continuation-in-part of application No. 08/057,803, filed on May 7, 1993, now abandoned.

(51) Int. Cl.[7] .......................... H04M 3/38; H04M 3/00; H04M 7/00
(52) U.S. Cl. ....................... 379/234; 379/240; 379/379; 379/198; 379/233; 379/244; 379/142; 379/252; 379/196; 379/211.02; 379/216.01
(58) Field of Search ................................. 379/219, 234, 379/225–233, 198, 240, 379, 196, 252, 211.02, 216.01

(56) References Cited

U.S. PATENT DOCUMENTS

| | | | |
|---|---|---|---|
| 3,806,660 A | * | 4/1974 | Gueldenpfennig et al. |
| 3,859,474 A | * | 1/1975 | Gueldenpfennig et al. |
| 3,867,581 A | | 2/1975 | Pommerening |
| 4,075,431 A | * | 2/1978 | Mukaemachi et al. |
| 4,133,982 A | | 1/1979 | Lee |
| 4,151,377 A | | 4/1979 | Whitaker |
| 4,310,725 A | | 1/1982 | Mehaffey |
| 4,401,856 A | | 8/1983 | Curtin et al. |
| 4,776,007 A | * | 10/1988 | Styrna et al. |
| 4,796,290 A | | 1/1989 | Perry |
| 4,894,860 A | | 1/1990 | Korsky et al. |
| 4,914,690 A | | 4/1990 | Hagedorn |
| 4,975,941 A | | 12/1990 | Morganstein et al. |
| 5,247,571 A | * | 9/1993 | Kay et al. |
| 5,422,941 A | * | 6/1995 | Hasenauer et al. |

OTHER PUBLICATIONS

IBM Technical Disclosure Bulletin "Direct Inward–Outward Dialing Trunk Circuit", Balourdet et al., vol. 11, No. 1, Jun. 1968.

* cited by examiner

*Primary Examiner*—Forester W. Isen
*Assistant Examiner*—Ramnandan Singh
(74) *Attorney, Agent, or Firm*—Robert E. Bushnell, Esq.

(57) ABSTRACT

A direct inward-outward dialing (DIOD) trunk circuit having a DIOD detecting/sending circuit connected to tip and ring terminals connected to a central office line and a primary coil of a transformer, for detecting a polarity of the voltage potential at the tip and ring terminals and the current flowing therethrough to determine reception of one of an incoming and outgoing telephone call, and a switch, controlled by a relay driver responsive to an interface circuit used for interfacing the DIOD trunk circuit with a switching circuit of a private branch exchange (PBX), for enabling the current to flow between the tip and ring terminals through the DIOD detecting/sending circuit via one of a low or high impedance path, wherein the low impedance path is used to establish a speech path between a central office line subscriber and a corresponding extension subscriber of the PBX.

16 Claims, 6 Drawing Sheets

FIG. 1 CONVENTIONAL PBX

DIRECT INWARD-OUTWARD DIALING TRUNK CIRCUIT

CROSS-REFERENCES TO RELATED APPLICATION

This continuation-in-part application makes reference to, incorporates herein and claims all benefits under 35 U.S.C. §119 and 35 U.S.C. §121 accruing from an application earlier filed in the U.S. Patent & Trademark Office on the May 7, 1993 entitled BIDIRECTIONAL DIALING TRUNK INTERFACING CIRCUIT assigned Ser. No. 08/057,803, which is now co-pending, and from a priority application earlier filed in the Korean Industrial Property Office on the May 9, 1992, and there duly assigned Ser. No. 7883/1992, a copy of which application is annexed hereto.

BACKGROUND OF THE INVENTION

1. Technical Field

The present invention relates to a trunk circuit for use in a private automatic branch exchange (PABX), and more particularly to a Direct Inward-Outward Dialing (DIOD) trunk circuit for bidirectional interfacing between a private automatic branch exchange (PABX) and a central office exchange (CX).

2. Related Art

Private automatic branch exchange (PBX) systems as described, for example, in U.S. Pat. No. 4,028,498 for Private Automatic Branch Exchange System And Apparatus issued to Mehaffey et al, U.S. Pat. No. 4,941,171 for Electronic Private Branch Exchange issued to Hasegawa, and U.S. Pat. No. 5,291,549 for Private Branch Exchange And Line Exchange Method issued to Izumi, are well known to utilize the step-by-step and crossbar switching techniques for providing switched communications between a plurality of extension subscribers and a central office exchange (CX). Trunk circuits are required to interface a number of trunk lines from the central office exchange (CX) to a number of telephone lines within the private automatic branch exchange (PBX). Typical trunk circuit can be application specific such as direct inward dialing (DID) trunk, direct outward dialing (DOD) trunk, signaling trunk and operator access trunk, or universal in nature to provide all of the necessary features as disclosed, for example, in U.S. Pat. No. 3,748,396 for Direct Inward Dialing Trunk Circuit issued to Hestad et aL, U.S. Pat. No. 3,806,660 for Trunk Circuit Having Selective Interface Combinations issued to Gueldenpfennig et al., U.S. Pat. No. 4,049,919 for Communication System Trunk Circuit issued to Young, U.S. Pat. No. 4,310,725 for Interface For Private Branch Exchange issued to Mehaffey, U.S. Pat. No. 4,776,007 for Solid State Trunk Circuit issued to Styrna et al., U.S. Pat. No. 4,894,860 for Trunk Interface Circuitry For Telephone Systems issued to Korsky et al., and U.S. Pat. No. 4,914,690 for Universal PBX Interface issued to Hagedorn.

For example, a DID trunk such as disclosed in U.S. Pat. No. 3,748,396 is used to allow a calling subscriber from a distant office to call a predetermined extension of the PABX through the central office exchange (CX) directly without an operator. When a calling subscriber dials the extension of the called subscriber of the private automatic branch exchange (PABX), the central office exchange (CX) downloads the extension of the called subscriber on a DID trunk and the PABX receives the extension number to route the call directly to the called subscriber. However, the DID trunk cannot be seized for direct outgoing calls from extension subscribers of the PABX to a distant office through the central office exchange (CX). A loop start trunk can be used for outgoing calls from extension subscribers of the PABX to a distant office through the central office exchange (CX). Both the DID trunk and loop start trunk can be implemented for handling incoming calls and outgoing calls. However, the combined trunk circuit requires construction of large inductance coils exhibiting high impedance and capacitors exhibiting high capacitance which are bulky and cost. A special trunk circuit, known as a direct inward-outward dialing (DIOD) trunk is circuit, can also be constructed for automatic operation on both incoming and outgoing calls such as disclosed in the IBM Technical Disclosure Bulletin, Vol. 11, No. 1, Jun. 1968.

Figure 1:
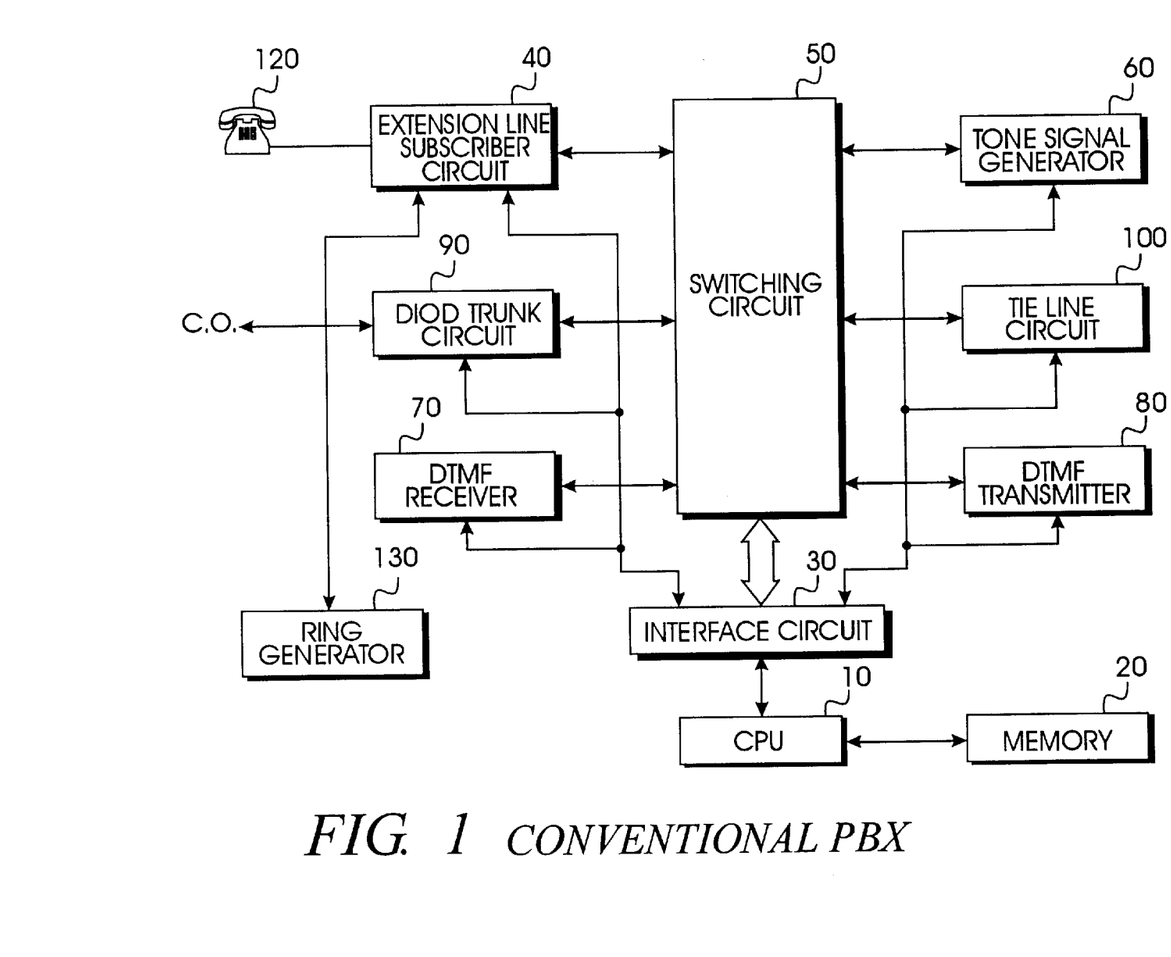
FIG. 1 is a block diagram of a conventional private automatic branch exchange system (PABX) having a DIOD trunk circuit for interface with a central office exchange (CX)

Conventional DIOD trunk circuit which is commonly incorporated into a private automatic branch exchange (PABX), is illustrated in FIG. 1. This private automatic branch exchange (PABX) is exemplary of an European PTT ALS-70 system which generally includes a central processing unit (CPU) 10, a memory 20, an interface circuit 30, at least an extension line subscriber circuit 40, a switching circuit 50, a tone signal generator 60, a dual-tone multi-frequency (DTMF) receiver 70, a DTMF transmitter 80, a DIOD trunk circuit 90, a tie line circuit 100, an extension subscriber telephone 120 and a ring generator 130 connected to the extension line subscriber circuit 40. The CPU 10 controls call switching operations of incoming and outgoing calls via the DIOD trunk circuit 90 connected to a central office line and the tie line circuit 100, and provides a variety of services to a system user. Memory 20 stores a program that enables the CPU 10 to perform call processing and a variety of other system functions. Switching circuit 50 switches various tone signals and voice signals under the control of the CPU 10. Subscriber circuit 40 transmits and receives a variety of tone signals and voice signals to and from an extension telephone 120 of an extension subscriber, selectively connects the extension telephone 120 to a central office C.O. line through the DIOD trunk circuit 90, supplies power to the extension telephone 120, and also acts as an interface between the extension telephone 120 and the switching circuit 50. Ring generator 130 generates a ring signal that is supplied to the extension telephone 120 through the subscriber circuit 40. Tone signal generator 60 generates various tone signals that are supplied to the switching circuit 50 under the control of the CPU 10. DTMF receiver 70 is connected to the switching circuit 50 for analyzing a dual-tone multi-frequency (DTMF) signal generated from the extension telephone 120. DTMF transmitter 80 generates and supplies the DTMF signal to the switching circuit 50 under the control of the CPU 10. The interface circuit 30 serves to interface the subscriber circuit 40, the tone signal generator 60, the DTMF receiver 70, the DTMF transmitter 80, the DIOD trunk circuit 90 and the tie line circuit 100 to the switching circuit 50.

Figure 2:
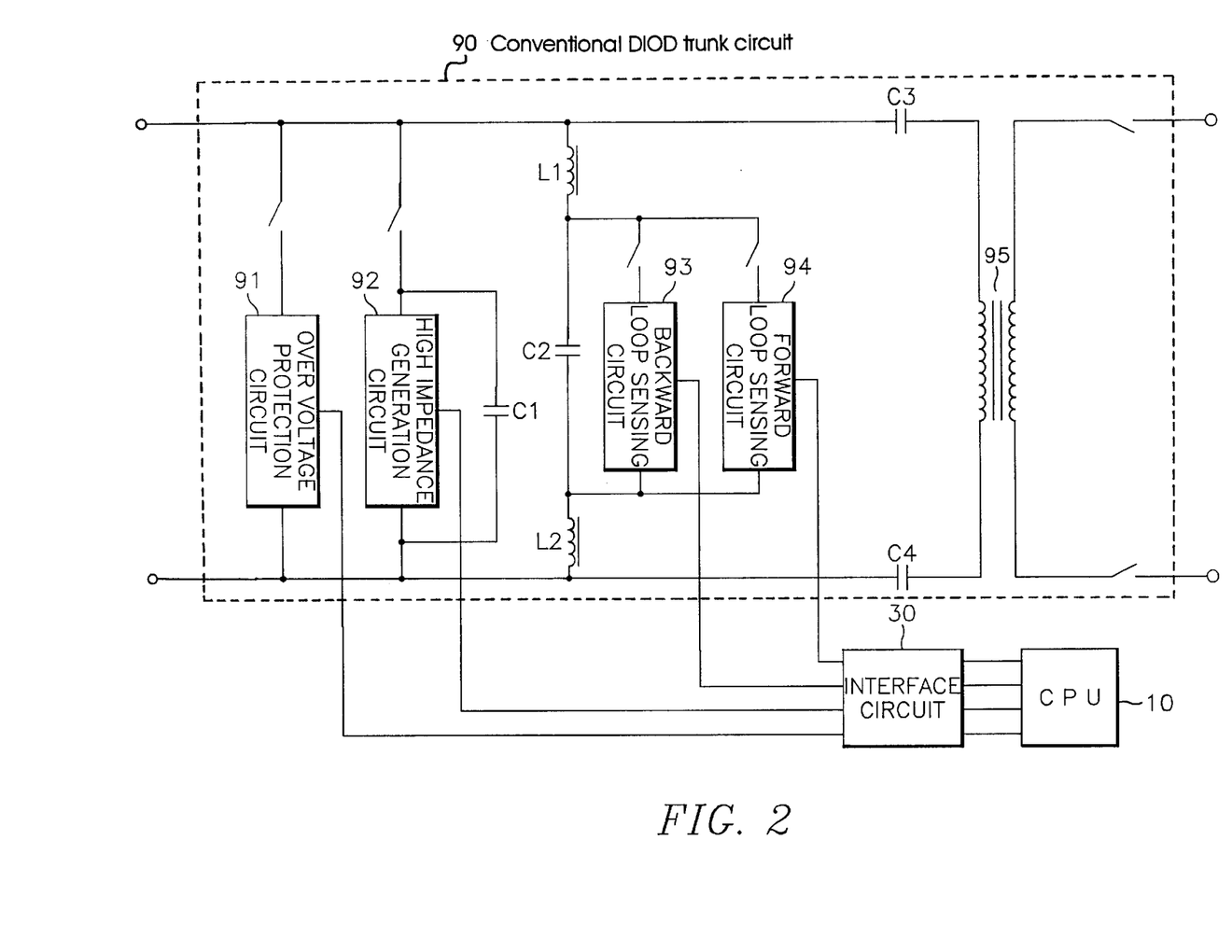
FIG. 2 is a detailed circuit diagram of a conventional DIOD trunk circuit as shown in FIG. 1.

FIG. 2 illustrates the conventional DIOD trunk circuit 90 which is connected to a central office C.O. line from a central office exchange (CX) and serves as an interface to the private automatic branch exchange (PABX). As shown in FIG. 2, the conventional DIOD trunk circuit 90 is constructed of an overvoltage protection circuit 91, a high impedance generation circuit 92, a backward loop sensing circuit 93, a forward loop sensing circuit 94, a large core transformer 95, and a series of large size coils L1 and L2 with high impedance and large size capacitors which are comparably expensive and add to the cost of the unit. For example, in order to adjust the balance of a transmission signal on the telephone line, capacitors C3 and C4 must have capacitance values of at least 1 $\mu$F/100V. The requirement of large inductance coils and high capacitors, as I have observed, is cost prohibitive and bulky. Accordingly, an improved DIOD trunk circuit for interface between a private automatic branch exchange (PABX) and a central office exchange (CX) can still be contemplated.

SUMMARY OF THE INVENTION

Accordingly, it is an object of the present invention to provide an improved trunk circuit for interface between a private automatic branch exchange (PABX) and a central office exchange (CX).

It is also an object to provide a direct inward-outward dialing (DIOD) trunk circuit for a private automatic branch exchange (PABX) designed to minimize the use of coils and capacitors with high capacitance in order to reduce cost and increase production.

It is another object of the present invention to provide a direct inward-outward dialing (DIOD) trunk circuit for a private automatic branch exchange capable of handling incoming direct inward dialed (DID) telephone calls and outgoing direct outward dialed (DOD) telephone calls without an operator.

These and other objects of the present invention can be achieved by a direct inward-output dialing trunk circuit which comprises a tip T and ring R terminals which are connected to a central office line with a battery source of −48 volts D.C. potential; and first and second transformers T1 and T2 connected in series and having a primary coil respectively connected to the tip T and ring R terminals and a secondary coil connected to a switching circuit 50 of the private automatic branch exchange (PABX) via a speaking circuit 102 for impedance matching and for forming a speech path between a central office line subscriber and a corresponding PABX extension subscriber 120 of the PABX. A tone signal detecting circuit 104 is connected to the speaking circuit 102 for detecting a dial tone generated by a tone supply circuit 60 in response to both incoming and outgoing calls. A DIOD signal detecting/sending circuit 101 is connected to the tip T and ring R terminals for detecting the polarity of the −48 volts D.C. potential at the tip T and ring R terminals and the current flowing through the tip T and ring R terminals to determine reception of the incoming and outgoing calls and to enable formation of the speech path between the central office line subscriber and the corresponding PABX extension subscriber 120 of the PABX via the central office line to the interface circuit 30. A switch SW1 is connected to the transformers for selectively enabling the current to flow between the tip T and ring R terminals at the central office line through the DIOD signal detecting/sending circuit 101 via either a low impedance loop or a high impedance loop comprised of a serially connected resistor R1 and diode D1, wherein the current passing through the low impedance loop from tip T terminal to ring R terminal at the central office line alerts the central office network or the PABX to form the speech path between the central office line subscriber and the corresponding PABX extension subscriber in response to one of incoming and outgoing calls, and wherein the current passing through the high impedance from ring R terminal to tip T terminal at the central office line alerts the CPU 10 to control a ring generator 130 to generate ringing tones to the calling subscriber from either the central office line or the PABX extension line. A relay drive circuit 107 is installed to control the switch SW1 by way of a relay coil L1 to select either the low impedance loop or the high impedance loop for the current to flow through the DIOD signal detecting/sending circuit 101 between tip T terminal and ring R terminal at the central office line.

The DIOD signal detecting/sending circuit includes a DIOD signal detecting unit and a DIOD signal sending unit. The DIOD signal detecting unit is comprised of an operational amplifier OP1 having an inverting terminal 6 connected to the tip T terminal at the central office line and a non-inverting terminal 5 connected to the ring R terminal at the central office line; a pair of transistors Q11 and Q12; and a photo-coupler PT3, for sensing the voltage polarity of the tip T and ring R terminals upon seizure of the PABX to establish the speech path between the central office line subscriber and the corresponding PABX extension subscriber when tip T terminal exhibits positive D.C. potential and ring R terminal exhibits negative D.C. potential and for providing a high impedance polarity inverting signal supplied from the central office line at a high impedance output terminal 14 to the CPU 10 via the interface circuit 30 to control the tone supply circuit 60 to generate the dial tone in response to, for example, an incoming call. When the voltage potential between tip T and ring R terminals is reversed, however, the DIOD detection circuit remains idle.

The DIOD signal sending unit is comprised of a series of diodes D11, D12, D13, D24, a pair of photo-couplers PT1, PT2 with an input terminal 4 for receiving and allowing the current flowing from tip T terminal via either the low impedance loop or the high impedance loop selected by switch SW1 to be current limited by a current limit circuit 121 and subsequently output to the ring T terminal at the central office line via a backward supply terminal 1. For example, upon seizure of the PABX in response to an incoming call, the battery provides positive D.C. potential to tip T terminal and negative D.C. potential to ring R terminal at the central office line so that current can flow from tip T terminal via the low impedance loop selected by switch SW1 and is limited by the current limit circuit 121 before reaching to ring R terminal in a low impedance state alerting the central office network to form a speech path between the central office line subscriber and the corresponding PABX extension subscriber. After the telephone number is dialed, switch SW1 switches to the high impedance loop so that the current flowing through the DIOD signal detecting/sending circuit 101 and the current limit circuit 121 before reaching to ring R terminal is in a high impedance state alerting the CPU 10 to control the ring generator 130 to generate ringing tones to the calling subscriber.

Lastly, an interface circuit 30 used to interface the DIOD trunk circuit 90 with the switching circuit 50 of the private automatic branch exchange (PABX) may be comprised of first, second and third latch circuits 105, 106, 107 for latching the dial tone detected by the tone signal detecting circuit 104, the polarity inverting signal applied from the central office line and the busy signal generated from the DIOD signal detecting/sending circuit 101 to the CPU 10; a control circuit 109 for driving the relay drive circuit 107 to control switch SW1 to select current flowing through either a high impedance loop or a low impedance loop under control of the CPU 10; and a buffer circuit 110 installed to buffer communication between the DIOD trunk circuit 90 and the CPU 10 of the private automatic branch exchange (PABX).

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 3:
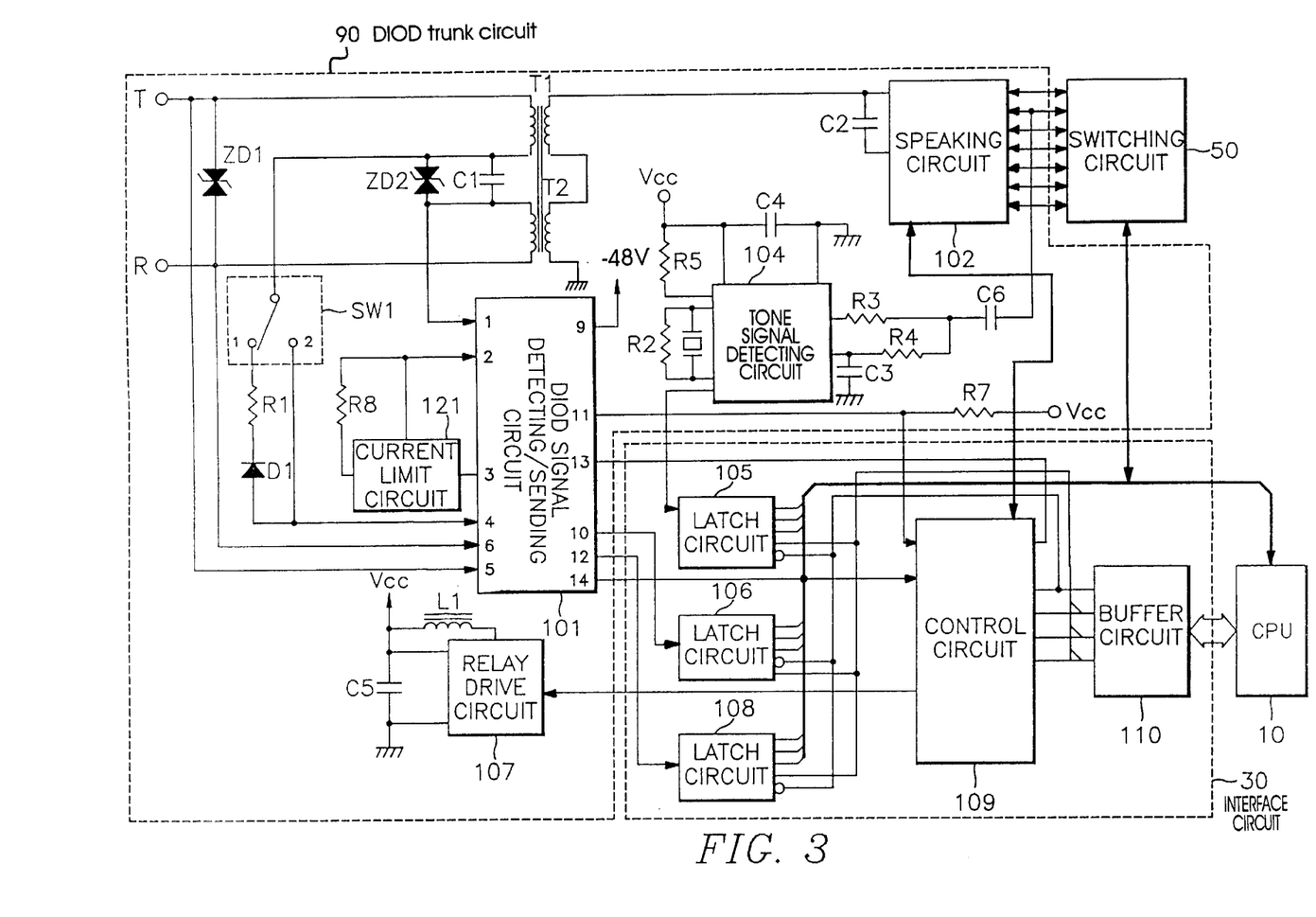
FIG. 3 is a block diagram of a DIOD trunk circuit constructed according to the principles of the present invention.

Referring now to the drawings and particularly to FIG. 3 which illustrates a direct inward-outward dialing (DIOD) trunk circuit constructed according to the principles of the present invention. As shown in FIG. 3, the DIOD trunk circuit includes first and second transformers T1 and T2 connected in series and having a primary coil respectively connected to tip T and ring R terminals of a central office line and a secondary coil respectively connected to a switching circuit 50 of the private automatic branch exchange (PABX) as shown in FIG. 1 via a speaking circuit 102 for impedance matching and for forming a speech path between a central office line subscriber and a corresponding PABX extension subscriber 120 of the PABX. A power source such as a battery of approximately 48 Volts is connected between the tip T and ring R wires at the central office with the tip T terminal usually connected to a positive side of the battery and the ring R terminal usually connected to a negative side of the battery. A first Zener diode ZD1 is disposed between the tip T and ring R terminals of the central office line. A second Zener diode ZD2 is disposed between the primary coil of the first transformer T1 and the primary coil of the second transformer T2. A first capacitor C1 is disposed in parallel with the second Zener diode ZD2 between the primary coil of the first transformer T1 and the primary coil of the second transformer T2. A second capacitor C2 is disposed in parallel with the speaking circuit 102 between the secondary coil of the first transformer T1 and the speaking circuit 102. A tone signal detecting circuit 104 is connected to the speaking circuit 102 for detecting a dial tone generated by a tone signal generator 60 (as shown in FIG. 1) in response to both incoming and outgoing calls. The tone signal detecting circuit 104 is constructed with a power source terminal Vcc and a plurality of resistors R2, R3, R4 in connection with capacitors C3, C4, and C6.

A DIOD signal detecting/sending circuit 101 is connected to the tip T and ring R terminals and the primary coil of the first and second transformers T1 and T2 for detecting the polarity of a D.C. potential at the tip T and ring R terminals and the current flowing through the tip T and ring R terminals to determine reception of the incoming and outgoing calls and to enable formation of the speech path between the central office line subscriber and the corresponding PABX extension subscriber 120 of the PABX via the central office line to the interface circuit 30. A switch SW1 is connected to the primary coil of the first transformer T1 for selectively enabling the current to flow between the tip T and ring R terminals at the central office line through the DIOD signal detecting/sending circuit 101 via either a low impedance loop or a high impedance loop formed of a serially connected resistor R1 and diode D1. Low impedance loop is provided so that the direct current received at tip T terminal and ring R terminal from the central office line can pass therethrough to alert the central office exchange CX or the PABX to form the speech loop between the central office line subscriber and the corresponding PABX extension subscriber in response to one of incoming and outgoing calls. High impedance loop is provided so that the direct current received at tip T terminal and ring R terminal from the central office line can pass therethrough to alert the CPU 10 to control a ring generator 130 to generate ringing tones to the calling subscriber from either the central office line or the PABX extension line. When the switch SW1 is switched to a first terminal 1, high impedance formed by a diode D1 and resistor R1 is provided to substantially impede alternating current (AC) signals originating from the central office from passing between the tip T and ring R terminals through the DIOD signal detecting/sending circuit 101. As a result, no speech path is formed. When the switch SW1 is switched to a second terminal 2, low impedance is provided to direct current and enable all AC signals originating from the central office from passing through the DIOD signal detecting/sending circuit 101 to establish a speech path.

A relay drive circuit 107 is responsive to the interface circuit 30 to control the switch SW1 by way of a relay coil L1 to select either the low impedance loop or the high impedance loop for the current to flow from the primary coil of the first transformer T1 through the DIOD signal detecting/sending circuit 101 between tip T terminal and ring R terminal at the central office line.

An interface circuit 30 which is used to interface the DIOD trunk circuit 90 with the switching circuit 50 of the private automatic branch exchange (PABX) may be comprised of first, second and third latch circuits 105, 106, 107 for latching a dial tone detected by the tone signal detecting circuit 104, a polarity reversal signal applied from the central office line and a busy signal generated from the DIOD signal detecting/sending circuit 101 to the CPU 10, a control circuit 109 for driving the relay drive circuit 107 to control switch SW1 to select current flowing through either a high impedance loop or a low impedance loop under control of the CPU 10, and a buffer circuit 110 installed to buffer communication between the DIOD trunk circuit 90 and the CPU 10 of the PABX.

As shown in FIG. 3, the DIOD signal detecting/sending circuit 101 is in a chip format that has a number of input terminals 1 to 6 connected to the tip T and ring R terminals, and a number of output terminals 10 to 14 connected to the interface circuit 30. For input terminals, a backward supply terminal 1 is coupled to the second Zener ZD2 to receive the current flowing from the ring R terminal. A forward supply terminal 4 is connected to the switch 1 which operates to direct the current flowing from the tip T terminal through the primary coil of the first transformer T1 via either a high impedance loop formed of a diode D1 and a resistor R1, and a low impedance loop. Current supply terminals 2 and 3 are respectively connected to a current limit circuit 121 which limits the current flowing between the tip T and ring R terminals; and a power source terminal 9 is connected to the battery of −48 Volts for power supply.

For output teas a backward battery sensing terminal 110 is connected to the second latch circuit 106 of the interface 30 to provide a backward battery signal to the CPU 10 via the control circuit 109 and the buffer circuit 110 in response to detection of a polarity reversal signal applied from the central office line. A forward battery sensing terminal 11 is connected to a power source terminal Vcc via a resistor R7 to provide a forward battery signal to the CPU 10 via the control circuit 109 and the buffer circuit 110. Both the backward and forward battery signals correspond to the polarity reversal signal applied from the central office line (i.e., reversal of a polarity of a 48 Volts power source applied from the central office line). A busy signal detection terminal 12 is connected to the third latch circuit 108 to provide a busy signal to the CPU IO via the control circuit 109 and the buffer circuit 110. A board protection terminal 13 is connected directly to the control circuit 109 to provide board protection. A high impedance output terminal 14 is connected directly to the control circuit 109 to provide a polarity reversal signal in a high impedance state indicating an incoming call.

Figure 4A:
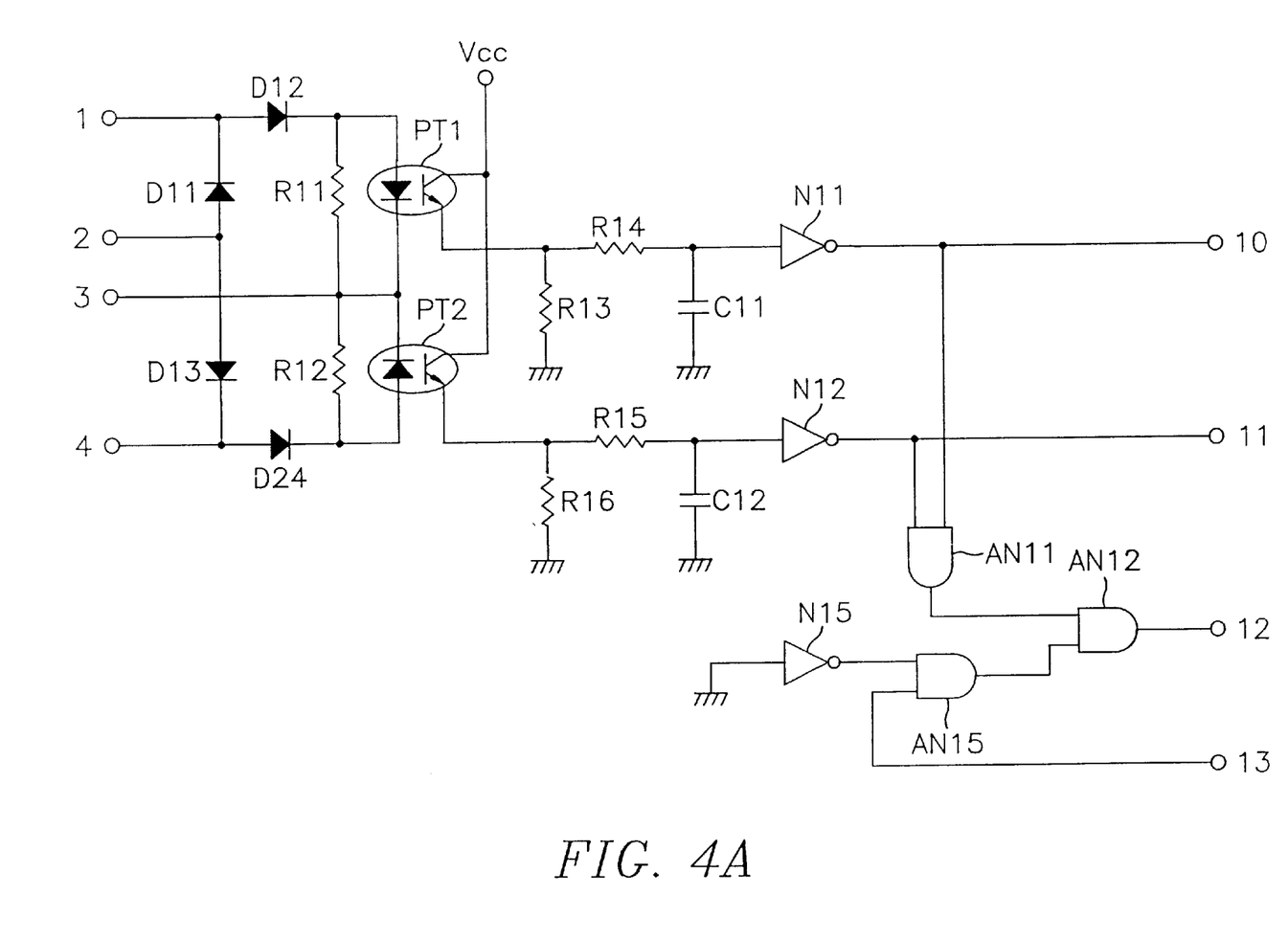
FIG. 4A and FIG. 4B illustrate a DIOD signal detecting/sending circuit of the DIOD trunk circuit as shown in FIG. 3.
Figure 4B:
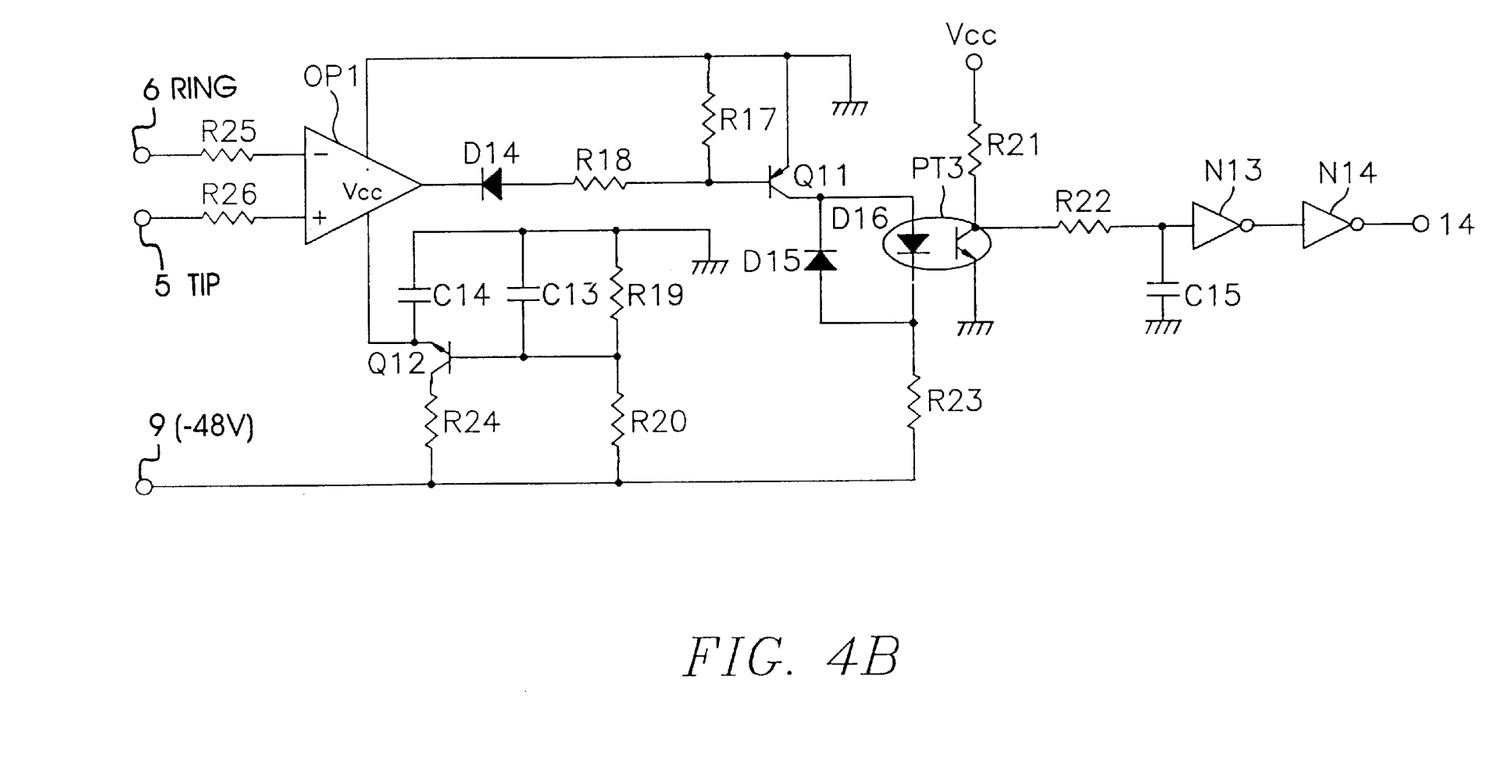

Refer now to FIGS. 4A and 4B which illustrate a detailed circuit diagram of the DIOD signal detecting/sending circuit 101. FIG. 4A illustrates the current sending portion of the DIOD signal detecting/sending circuit 101 which is constructed of first and second photo-couplers PT1 and PT2 each comprised of a light emitting diode connected between the backward supply terminal 1 and the forward supply terminal 4 with a respective cathode of the light emitting diode connected to the current limiting terminal 3, and a NPN type transistor with a respective collector connected to a power supply terminal Vcc. Diodes D11 and D13 are oppositely arranged between the current limiting terminal 2 and the backward and forward supply terminals 1 and 4 respectively. Diodes D12 and D24 are respectively connected between the first and second photo-couplers PT1 and PT2 and the backward and forward supply terminals 1 and 4. Resistors R11 and R12 are connected in series between a respective cathode of diodes D12 and D24 and the current limiting terminal 3. Inverters N11 and N12 are connected between a respective emitter of transistor of the first and second photo-couplers PT1 and PT2 via resistors R14 and R15 and the backward and forward battery sensing terminals 10 and 11. Respective resistors R13 and R16 and capacitors C11 and C12 are connected in parallel on both sides of resistors R14 and R15. A first AND gate AN11 has input terminals connected to receive outputs of the inverters N11 and N12. A second AND gate AN15 has input terminals connected to ground via an inverter N15 and the board protection terminal 13; and a third AND gate AN12 has input terminals coupled to receive outputs of the first and second AND gates AN11 and AN15 and an output terminal serving as the busy signal detection terminal 12.

FIG. 4B illustrates the high impedance detecting portion of the DIOD signal detecting/sending circuit 101 which is constructed of an operational amplifier OP1 having an inverting input terminal connected to the ring R terminal via resistor R25 and a non-inverting input terminal connected to the tip T terminal via resistor R26. A PNP type transistor Q11 having a base connected to an output of the OP1 via a resistor R18 and a diode D14, and an emitter connected to a power supply input of the OP1. A resistor R17 is connected between the base of the PNP type transistor Q11 and the power supply input of OP1. A diode D15 and a resistor R23 are connected in series between the collection of the PNP type transistor Q11 and the power supply terminal 9. A NPN type transistor Q12 having an emitter connected to the power supply unit of the OP1 and a collector connected to the power supply terminal 9 via a resistor R24. Resistors R19 and R20 are connected in series between the power supply terminal 9 and ground with a common node connected to a base of the NPN type transistor Q12. Capacitors C13 and C14 are connected in parallel between ground and the emitter and base of the NPN type transistor Q12 respectively. A photo-coupler PT3 comprised of a light emitting diode connected to collector of the PNP type transistor Q11 and a NPN type transistor with a collector connected to a power supply terminal Vcc via a resistor R21, an emitter connected to ground. A pair of inverters N13 and N14 are connected in series between a collector of transistor of the photo-coupler PT3 via a resistor R22 and the high impedance output terminal 14; and a capacitor C15 is connected in parallel to resistor R22.

Figure 5:
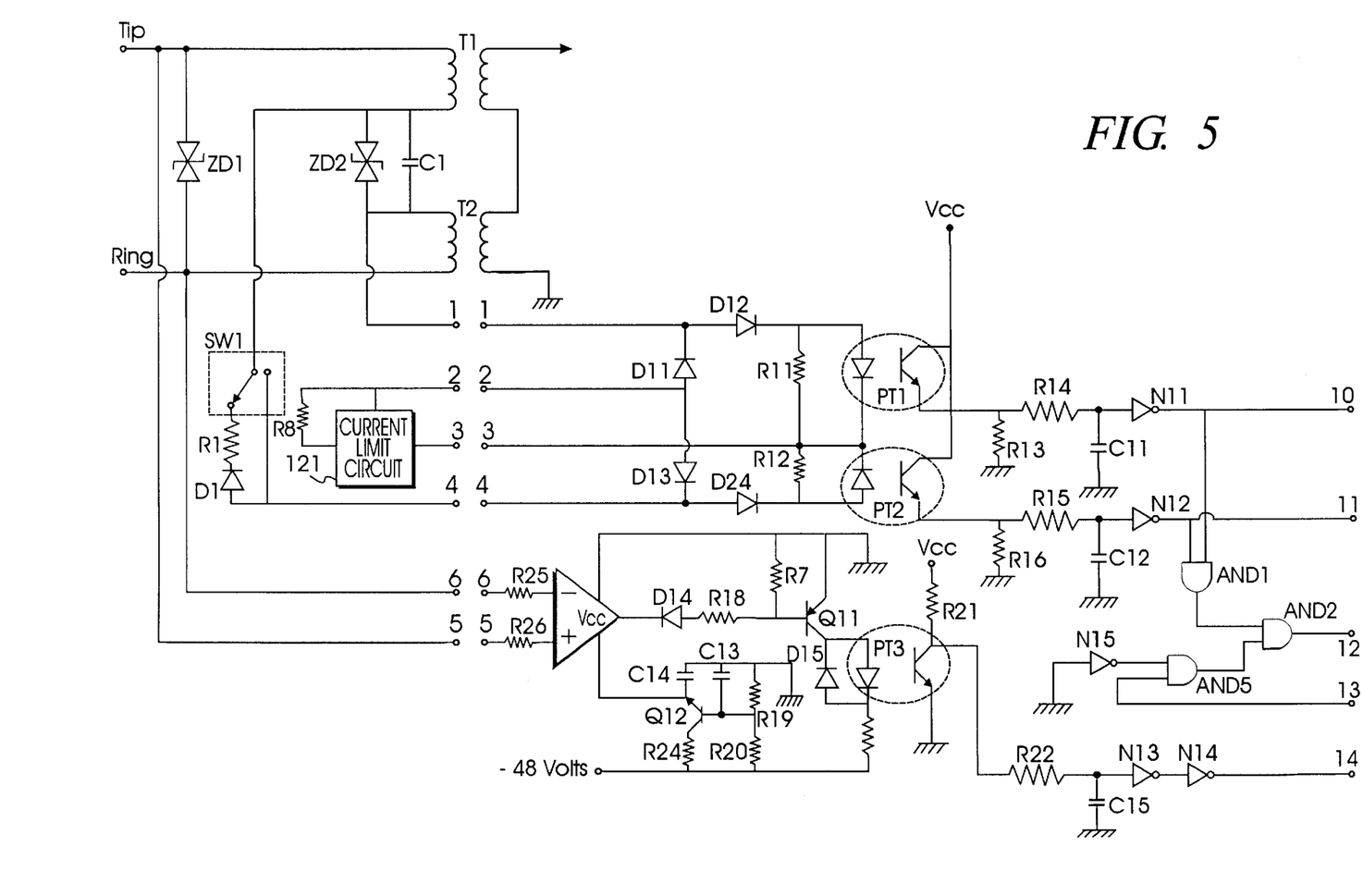
FIG. 5 is a detailed circuit diagram of the DIOD trunk circuit constructed according to the principles of the present invention.

Alternatively, FIG. 5 illustrates a detailed circuit diagram of the DIOD trunk circuit 90 having the DIOD signal detecting/sending circuit 101 as shown in FIGS. 4A and 4B incorporated therein. The high impedance detection portion of the DIOD signal detecting/sending circuit 101 is responsive to the current flowing between the tip T and ring R terminals of the central office line to generate an output signal at high impedance output terminal 14 that is "high" or "low" depending upon the reversal of battery power of 48 Volts.

Now, the operation of the DIOD trunk circuit 90 of the present invention will be briefly described as follows. When the DIOD trunk circuit 90 remains on-hook (idle), no direct current is flowed between the tip T and ring R terminal When the central office exchange CX places a ringing voltage between the tip T and ring R terminal while the DIOD trunk circuit 90 remains on-hook (ringing), the PABX is seized in response to an incoming call from the central office line, the DIOD trunk circuit 90 inverts a polarity of 48V power source supplied from the central office line in a high impedance state, instead of a ring signal in a conventional loop start trunk. The ring generator 130 of the PABX then alerts either an operator or an PABX extension subscriber of an incoming call. The DIOD trunk circuit 90 then controls the switching circuit 50 to establish a speech path between the central office line subscriber and the PABX extension subscriber via a corresponding subscriber circuit 40 and the switching circuit 50. That is, before a dual-tone multi-frequency (DTMF) signal is received, the speech path is formed, and a ring back tone or a busy tone in the tone supply circuit 60 is provided as in the D1D interfacing technique. Here, since the speech path is already formed, the central office exchange CX need not be informed of the free or busy state. However, for charging the call later, when the called extension subscriber is in an off-hook condition, the 48 Volts feeding current is supplied to the central office exchange CX via the central office line.

In the conventional European PABX as shown in FIG. 1 using the conventional DIOD trunk circuit 90 of FIG. 2, metering pulses are used for charging. The PABX counts the number of metering pulses, and a high impedance state informs the central office exchange system when the DTMF signal is received. The central office exchange CX stops sending the DTMF signal when the high impedance state is recognized. In case of an outgoing call (i.e., the PABX extension subscriber calls the central office line subscriber), the DIOD trunk circuit 90 uses only the advantages in functions of the loop start method.

A preferred embodiment of the present invention will now be described in detail with reference to FIGS. 3, 4A–4B and 5 hereinbelow. When a central office line subscriber seizes the central office line to call a subscriber in a private automatic branch system (PABX), direct current of 48 Volts is received from the central office source by the tip T and ring R terminals, and the DIOD trunk circuit 90 inverts the polarity of the direct current applied from the central office line in a high impedance state.

Since the signal sent from the central office line is a high impedance polarity reversal signal, the detecting portion of the DIOD signal detecting/sending circuit 101 requires an almost infinite input impedance. As shown in FIG. 4B, the detecting portion of the DIOD signal detecting/sending circuit 101 uses an operational amplifier OP1 having a differential amplifying function with a comparator, and an output terminal coupled through a diode D14 and a resistor R18 to a base of a transistor Q11, whose collector is coupled to a photo-coupler PT3. The output terminal of the photo-coupler PT3 is coupled to a resistor R22 and a serially connected inverters N13 and N14. A transistor Q12 is turned on by the divided voltage of resistors R19 and R20 to divide the supplied voltage −48 Volts from the power supply terminal 9 to supply −24V to the voltage terminal Vcc of the operational amplifier OP1. At this point, if the tip T terminal S becomes negative and the ring R terminal 6 becomes positive, transistor Q11 is turned off with no output from the operational amplifier OP1 and as a result, the photo-coupler PT3 is also turned off. Also, the output of the inverter N14 becomes "high" state to indicate an idle state.

Meanwhile, when the private automatic branch exchange system is seized upon reception of a high impedance polarity reversal signal indicating an incoming call transmitted from the central office exchange (CX) via the central office line, and power source polarities supplied to the tip T and ring R terminals 5 and 6, if the tip terminal 5 is positive and the ring terminal 6 becomes negative, the input polarity of the operational amplifier OP1 is changed, i.e., the output polarity of the operational amplifier OP1 is changed. Accordingly, the output polarity of the operational amplifier OP1 becomes a "low" state, thereby turning on the transistor Q11. At this time, the grounded power source in the emitter of transistor Q11 flows current to the −48V terminal 9 through the photo-coupler PT3. When the light emitting diode D16 of the photo-coupler PT3 is turned on, the photo transistor is turned on and its collector becomes a "low" state. The "low" state is not changed by passing through inverters N13 and N14. The "low" state signal is transmitted to the CPU 10 through the control circuit 109 and the buffer circuit 110 as shown in FIG. 3. Accordingly, the CPU 10 controls the tone supply circuit 60 through the interface circuit 30 to generate a dial tone whenever a call is initiated from either a central office line or the PABX subscriber line, and the switching circuit 50 to send the dial tone to the central office line subscriber as shown in FIG. 1. A DTMF signal is then received by the DTMF receiving circuit 70 through the DIOD trunk circuit 90 and switching circuit 50 and is sent to the CPU 10. Meanwhile, when the DTMF signal from the central office exchange CX is received according to an assigned extension number or there is an undesirable number or an unauthorized number, a high impedance signal is sent to the central office exchange CX as a received signal for a dialed number.

That is, the control circuit 109 of the interface circuit 30 controls the relay drive circuit 107 to drive the coil Li and accordingly switch the switch SW1 to position 1 to form a high impedance loop. At this time, position 1 is connected to the resistor R1 and the diode D1 coupled to the forward supply terminal 4 as shown in FIG. 4A, so that a signal exhibiting a high impedance state is sent to the central office exchange CX. That is, the signal passes the diode D24 as shown in FIG. 4A from the tip T teal through the resistor R1and the diode D1 and the forward supply terminal 4. Then, the photo-coupler PT2 is driven and the current flowing to the current limit circuit 121 through the output terminal 3 of the DIOD signal detecting/sending circuit 101 is limited.

The limited current is supplied to the backward supply terminal 1 through the input terminal 2 of the DIOD signal detecting/sending circuit 101 and the diode D11, so that a signal exhibiting a high impedance state is sent to the ring R terminal coupled to the central office line through the transformer T2. During the DID function performance, this is a circuit for sending a number receiving signal to the central office exchange CX, when the PABX receives all digits from the central office exchange CX through the central office line and the DIOD trunk circuit 90 or receives an undesirable extension number or an unauthorized extension number and accordingly no more digit information is needed.

Before the signal exhibiting a high impedance state is sent, the relay drive circuit 107 is driven to switch the switch SW1 to position 2 to form a low impedance loop. This indicates that the DTMF receiving circuit 70 is controlled by the CPU 10 to receive a DTMF signal. When it is no longer necessary for the DTMF receiving circuit 70 to receive the DTMF signal, switch SW1 switches to position 1 under control of the relay drive circuit 107. Accordingly, a high impedance loop is formed by the resistor R1 and the diode D1, thereby sending a signal exhibiting a high impedance state to the central office line. This signal is maintained until the corresponding extension subscriber 120 hears ring generation tones of the ring generation circuit 130 and hangs off, as shown in FIG. 1. At this time, a ring back tone provided from the tone supply circuit 60 passes the speaking circuit 102 of the DIOD trunk circuit 90 through the switching circuit 50 coupled to the speech path and is then converted in the transformers T1 and T2 and is sent to the central office line.

The sending portion of a signal exhibiting a high/low impedance state in the DIOD signal detecting/sending circuit 101 will now be described in detail hereinbelow. Current flowing in the current limit circuit 121 is limited through the diode D24 and the resistor R12 between the forward supply terminal 4 and the current limit terminal 3 of the DIOD signal detecting/sending circuit 101 as shown in FIG. 4A according to position 1 or 2 of the switch SW1. The limited current is sent through the diode D11 and the terminal 1 to the tip terminal T of the central office line. At this time, the current flowing is below approximately 3 mA, which is recognized in the central office exchange CX. Accordingly, charging is started and the central office exchange CX connects the speech path. This high impedance state is a ring back tone sending state and when this signal is normally recovered, the telephone call is started.

With reference to FIG. 3, when switch SW1 is switched to position 2 by excitation of a relay coil L1 connected to the relay drive circuit 107, the current flowing in the current limit circuit 121 through the diode D24, the photo-coupler PT2 and the terminal 3 is limited to 30 mA. The current limited in the current limit circuit 121 passes the transformer T2 through the diode D11 and sends a signal exhibiting a low impedance state to the ring terminal R of the central office line. And, the signal exhibiting a low impedance state is converted in transformer T1 through the tip terminal T and is input to the forward supply terminal 4 of the DIOD signal detecting/sending circuit 101 through position 2 of the switch SW1, thereby being passed through the photo-coupler PT2 through the diode D24. The signal passing the photo-coupler PT2 is current-limited in the current limit circuit 121 through the terminal 3 and passes the terminal 2 and is converted in the transformer T2 through the diode D11.

The signal passing through the transformer T2 flows current to the ring terminal R of the central office line. The emitter of each photo transistor is inverted in the inverters N11 and N12 through the resistors R14 and R15 according to the driving of the photo-couplers PT1 and PT2. Accordingly, a backward battery signal is sensed in the backward battery sensing terminal 10, and a forward battery signal is sensed in the forward battery sensing terminal 11. When the two signals are received, if any one is in "low" state, the AND gate AN11 outputs "low" state, thereby generating a busy signal in the AND gate AN12. That is, it is generated regardless of the output of the AND gate AN13 generated from the state of the board protecting terminal 13 and the signal passed through the inverter N15. After a signal exhibiting a low impedance state is sent through the central office line as described above, and it is sensed in the central office exchange CX. Then the central office exchange CX connects the speech path.

In view of the speech path connection, regardless of the state of the loop relay, only the time switch is turned on/off in the switch circuit 50, thereby enabling operation of the tone supply circuit 60 and the DTMF sending and receiving circuits 70, 80. That is, the tone signal detecting circuit 104 of FIG. 3 performs the function of the DTMF sending and receiving circuits 70 and 80 and the tone supply circuit 60.

As described above, the DIOD trunk functions for enabling the bidirectional dialing between a private automatic branch exchange (PABX) and a central office exchange (CX). The DIOD trunk circuit of the present invention can advantageously interface with the conventional central office exchange in order to improve system reliability and enhance installation.

When the trunk circuit remains idle, the trunk line circuit is in the state capable of receiving a ring signal and a direct current loop circuit is not connected thereto. That is, the above trunk line circuit has a specific impedance in an alternating current state, while being opened in a direct current state. Therefore, the trunk line circuit is in a high impedance sate, when the trunk circuit remains idle. When ring tones are generated during the on-hook state, that is, when communication established between the central office line subscriber and the PBX subscriber, the call is generated from the central office line subscriber to the PBX subscriber and communication is established therebetween. A central office exchange provides the central office line subscriber with a ringing tone and the PBX subscriber with a ring tone. At this time, the trunk line circuit is provided with a ring tone as being a speech path formed in a high impedance state.

Pulse-dialing is address signaling. In many cases, tone signals are used for signaling in the PSN network. In a DIOD trunk circuit constructed according to the present invention, there is formed of a speech path in an idle state. The speech path as stated above is formed in order for a ring tone to be provided from the central office exchange. Therefore, the speech path of the voice signal is always formed in an idle state (on-hook state). Further, in the present invention, the voice signal is provided to a CODEC within a speaking circuit in the following progression; a tip-a capacitor-a transformer-a CODEC.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A trunk circuit for interfacing a private branch exchange serving a plurality of extension subscribers to a central office line of a central office exchange, said trunk circuit comprising:

tip and ring terminals connected to the central office line of the central office exchange with a power source providing a voltage potential;

a transformer having a primary coil respectively connected to the tip and ring terminals, and a secondary coil connected to a switching circuit of the private branch exchange;

tone signal detection means connected to the switching circuit of the private branch exchange, for detecting a dial tone generated in response to one of incoming and outgoing telephone calls;

direct inward-outward dialing detection means connected to the tip and ring terminals and the primary coil of the first and second transformers, for detecting a polarity of the voltage potential at the tip and ring terminals and the current flowing through the tip and ring terminals to determine reception of one of the incoming and outgoing telephone calls for enabling formation of a speech path between a central office line subscriber and a corresponding extension subscriber of the private branch exchange;

a switch connected the primary coil of the first transformer, for selectively enabling the current to flow between the tip and ring terminals at the central office line through said direct inward-outward dialing detection means via one of a low impedance loop and a high impedance loop; and a relay driver for controlling operation of said switch to select between one of the low impedance loop and the high impedance loop for the current to flow through said direct inward-outward dialing detection means between the tip terminal and the ring terminal at the central office line.

2. The trunk circuit of claim 1, further comprising: current limiting means connected to said direct inward-outward dialing detection means, for limiting the current flowing between the tip terminal and the ring terminal at the central office line.

3. The trunk circuit of claim 2, wherein said direct inward-outward dialing detection means comprises:

current means for supplying limited current provided by said current limiting means to said second transformer; and a pair of photo-couplers connected to said current means, with collectors of said photo-couplers connected to each other and emitters of said photo-couplers coupled together by a logic gate, for generating a busy signal based upon output signals of said respective emitters.

4. The trunk circuit of claim 2, wherein said direct inward-outward dining detection means comprises:

current means for sending limited current provided by said current limiting means to said second transformer; and a pair of photo-couplers connected to said current means, with collectors of said photo-couplers connected to each other and emitters of said photo-couplers coupled together by a logic gate, for generating a busy signal based upon output signals of said respective emitters.

5. The trunk circuit of claim 4, wherein said direct inward-outward dialing detection means comprises:

an operational amplifier having an inverting terminal connected to the tip terminal at the central office line and a non-inverting terminal connected to the ring terminal at the central office line; and means for sensing the polarity of the voltage potential between the tip and ring terminals upon seizure of the private branch exchange system to establish the speech path between the central office line subscriber and the corresponding extension subscriber, when tip terminal exhibits a positive voltage potential and the ring terminal exhibits a negative voltage potential.

6. The trunk circuit of claim 5, wherein the current passing through the low impedance loop from the tip terminal to the ring terminal at the central office line alerts one of the central office network and the private branch exchange system to form the speech path between the central office line subscriber and the corresponding extension subscriber in response to one of incoming and outgoing calls, and wherein the current passing through the high impedance loop from the ring terminal to the tip terminal at the central office line enables generation of a ringing tone to the calling subscriber from one of the central office line and the corresponding extension line.

7. The trunk circuit of claim 1, wherein said direct inward-outward dialing detection means comprises:

comparator means for generating a comparison signal in dependence upon detection of an inverted polarity between said tip and ring terminals of the central office line;

a transistor having a base connectable to receive said comparison signal and allow transistor current to flow in response to said comparison signal; and a photo-coupler connected to said transistor for generating a high impedance polarity signal in response to the transistor current to alert the central office network to form the speech path between the central office line subscriber and the corresponding extension subscriber.

8. The trunk circuit of claim 1, wherein said direct inward-outward dialing detection means comprises:

current means for limiting the current flowing between the tip terminal and the ring terminal and supplying the limited current to said second transformer; and a pair of photo-couplers connected to said current means, with collectors connected to each other, to generate a forward battery sensing signal and a backward battery sensing signal corresponding to the limited current flowing from the tip terminal to the ring terminal.

9. The trunk circuit of claim 8, wherein said direct inward-outward dialing detection means comprises:

an operational amplifier having an inverting terminal connected to the tip terminal at the central office line and a non-inverting terminal connected to the ring terminal at the central office line; and means for sensing the polarity of the voltage potential between the tip and ring terminals upon seizure of the private branch exchange system to establish the speech path between the central office line subscriber and the corresponding extension subscriber, when tip terminal exhibits a positive voltage potential and the ring terminal exhibits a negative voltage potential.

10. The trunk circuit of claim 1, wherein said direct inward-outward dialing detection means comprises:

an operational amplifier having an inverting terminal connected to the tip terminal at the central office line and a non-inverting terminal connected to the ring terminal at the central office line; and means for sensing the polarity of the voltage potential between the tip and ring terminals upon seizure of the private branch exchange system to establish the speech path between the central office line subscriber and the corresponding extension subscriber, when tip terminal exhibits a positive voltage potential and the ring terminal exhibits a negative voltage potential.

11. The trunk circuit of claim 1, wherein the current passing through the low impedance loop from the tip terminal to the ring terminal at the central office line alerts one of the central office network and the private branch exchange system to form the speech path between the central office line subscriber and the corresponding extension subscriber in response to one of incoming and outgoing calls, and wherein the current passing through the high impedance loop from the ring terminal to the tip terminal at the central office line enables generation of a ringing tone to the calling subscriber from one of the central office line and the corresponding extension line.

12. The trunk circuit of claim 11, wherein the current passing through the low impedance loop from the tip terminal to the ring terminal at the central office line alerts one of the central office network and the private branch exchange system to form the speech path between the central office line subscriber and the corresponding extension subscriber in response to one of incoming and outgoing calls, and wherein the current passing through the high impedance loop from the ring terminal to the tip terminal at the central office line enables generation of a ringing tone to the calling subscriber from one of the central office line and the corresponding extension line.

13. A trunk circuit for interfacing a private branch exchange system having a plurality of extension subscribers and a central office line of a central office network, said trunk circuit comprising:

a tip and ring terminals connected to the central office line and a power source;

first and second transformers having a primary coil respectively connected to the tip and ring terminals and a secondary coil connected to the private branch exchange system for impedance matching, and for enabling formation of a speech path between a central office line subscriber and a corresponding extension subscriber of the private branch exchange system;

tone signal detection means connected to the private branch exchange system, for detecting a dial tone generated in response to one of incoming and outgoing telephone call;

direct inward-outward dialing detection means connected to the tip and ring terminals, for detecting a polarity of a voltage potential at the tip and ring terminals and the current flowing through the tip and ring terminals to determine reception of one of the incoming and outgoing telephone calls for enabling formation of the speech path between the central office line subscriber and the corresponding extension subscriber;

a switch connected to the primary coil of the first transformer, for selectively enabling the current to flow between the tip and ring terminals at the central office line through said direct inward-outward dialing detection means via one of a low impedance loop and a high impedance loop, wherein the current passing through the low impedance loop from the tip terminal to the ring terminal at the central office line alerts one of the central office network and the private branch exchange system to form the speech path between the central office line subscriber and the corresponding extension subscriber in response to one of incoming and outgoing calls, and wherein the current passing through the high impedance loop from the ring terminal to the tip terminal at the central office line enables generation of a ringing tone to a calling subscriber from one of the central office line and the corresponding extension line; and a relay driver for controlling operation of said switch to select one of the low impedance loop and the high impedance loop for the current to flow through said direct inward-outward dialing detection means between the tip terminal and the ring terminal at the central office line.

14. The trunk circuit of claim 13, further comprised of said direct inward-outward dialing means comprising:

an operational amplifier having an inverting terminal connected to the tip terminal at the central office line and a non-inverting terminal connected to the ring terminal at the central office line; and means for sensing the polarity of the voltage potential between the tip and ring terminals upon seizure of the private branch exchange system to establish the speech path between the central office line subscriber and the corresponding extension subscriber, when tip terminal exhibits a positive voltage potential and the ring terminal exhibits a negative voltage potential, and for controlling the generation of the dial tone in response to one of the incoming and outgoing telephone calls.

15. The trunk circuit of claim 13, further comprising:

means for limiting the current flowing from tip terminal via one of the low impedance loop and the high impedance loop selected by said switch means for subsequently output to the ring terminal at the central office line to alert the central office network to form a speech path between the central office line subscriber and the corresponding extension subscriber, and alternately alert the private branch exchange system to generate the ringing tone to a calling subscriber indicating one of the central office line subscriber and the corresponding extension subscriber.

16. The trunk circuit of claim 13, further comprised of said high impedance loop being formed by a serially connected resistor and diode.

* * * * *